United States Patent [19]

Kobayashi et al.

[11] Patent Number: 4,517,802
[45] Date of Patent: May 21, 1985

[54] TURBOCHARGER COMBUSTOR METHOD

[75] Inventors: Robert J. Kobayashi, Rancho Palos Verdes; James H. Nancarrow, Torrance, both of Calif.; Jeffrey L. Alger, Phoenix, Ariz.

[73] Assignee: The Garrett Corporation, Los Angeles, Calif.

[21] Appl. No.: 572,283

[22] Filed: Jan. 20, 1984

Related U.S. Application Data

[60] Division of Ser. No. 413,640, Sep. 1, 1982, Pat. No. 4,464,901, which is a continuation of Ser. No. 142,538, Apr. 21, 1980, abandoned, which is a continuation of Ser. No. 855,048, Nov. 25, 1977, abandoned.

[51] Int. Cl.³ .............................................. F02B 37/00
[52] U.S. Cl. ..................................................... 60/606
[58] Field of Search ............ 60/605, 606, 614, 39.09 F, 60/748; 239/405, 406, 427, 427.3, 427.5, 433

[56] References Cited

U.S. PATENT DOCUMENTS

| | | | |
|---|---|---|---|
| 1,339,579 | 5/1920 | Runyan | 239/406 |
| 1,451,063 | 4/1923 | Anthony | 239/406 |
| 2,379,455 | 7/1945 | Prince | 60/606 X |
| 2,608,051 | 8/1952 | Nettel | 60/606 |
| 2,654,991 | 10/1953 | Nettel | 60/606 |
| 3,096,615 | 7/1963 | Zuhn | 60/606 |
| 3,163,984 | 1/1965 | Dumont | 60/606 |
| 3,676,999 | 7/1972 | Oldfield | 60/606 |
| 3,831,854 | 8/1974 | Sato et al. | 60/748 X |
| 3,988,894 | 11/1976 | Melchior | 60/606 |
| 4,004,414 | 1/1977 | Melchior et al. | 60/606 |
| 4,018,053 | 4/1977 | Rudert et al. | 60/606 |
| 4,044,553 | 8/1977 | Vaught | 60/748 X |
| 4,114,379 | 9/1978 | Melchior et al. | 60/606 |
| 4,160,365 | 7/1979 | Petrov et al. | 60/606 |

FOREIGN PATENT DOCUMENTS

| | | | |
|---|---|---|---|
| 1040839 | 10/1958 | Fed. Rep. of Germany | 60/606 |
| 2207221 | 9/1973 | Fed. Rep. of Germany | 60/606 |
| 825761 | 12/1959 | United Kingdom | 60/606 |
| 882393 | 11/1961 | United Kingdom | 60/606 |

Primary Examiner—Michael Koczo
Attorney, Agent, or Firm—Albert J. Miller

[57] ABSTRACT

A combustor system for use with a turbocharged combustion engine comprises a combustor connected for continuous passage of engine exhaust gases. The combustor includes a relatively low pressure fuel injection system for atomizing fuel for combustion in a substantially vitiated atmosphere, and a fuel control system for supplying fuel to the combustor in response to engine operating conditions.

15 Claims, 7 Drawing Figures

TURBOCHARGER COMBUSTOR METHOD

This is a division of application Ser. No. 413,640 filed Sept. 1, 1982 now U.S. Pat. No. 4,464,901, which is a continuation of application Ser. No. 142,538 filed Apr. 21, 1980 now abandoned, which is a continuation of application Ser. No. 855,048 filed Nov. 25, 1977 now abandoned.

BACKGROUND OF THE INVENTION

This invention relates to subject matter disclosed in concurrently filed application Ser. No. 855,047, now U.S. Pat. No. 4,215,549, in the name of J. C. Daeschner.

This invention relates to auxiliary combustor systems for use with combustion engines. More specifically, this invention relates to an improved combustor system particularly for use with turbocharged reciprocating engines, and providing closely controlled combustor operation at virtually all engine operating conditions.

Auxiliary combustor systems for use with combustion engines are well known in the prior art. Specifically, such combustor systems are provided with combustion engines such as a turbocharged diesel engine wherein the available energy level of engine exhaust gases at relatively low speed conditions is insufficient to drive the turbocharger to provide the desired turbocharger boost to maintain engine load-carrying capacity. Accordingly, an auxiliary combustor is provided for supplementing the energy level of the exhaust gases supplied to the turbocharger at these relatively low speed conditions, and thereby supplementally drive the turbocharger to provide the desired boost pressure.

Prior art cumbustor systems have required a supply of fresh charge air to the combustor in order to obtain and maintain propagation of a combustor flame. In this regard, it has been common practice to provide bypass means for bypassing a portion of the compressed charge air from the turbocharger around the engine, and to conveniently position the combustor in the bypass means. Importantly, the turbocharger has been sized so that excess charge air is always available whereby fresh air is supplied to the combustor at all conditions of engine operation to maintain a combustor flame. See, for example, U.S. Pat. Nos. 3,048,005; 3,570,240; and 3,996,747. However, with these systems, inefficient quantities of fuel are burned in the combustor in order to maintain the desired high energy level of gases flowing through the combustor. Moreover, secondary ignition of fuel remnants in the engine exhaust gases is not possible.

Other prior art combustor systems have attempted to connect a combustor in series, or in-line, with exhaust gases exiting the engine. In this manner, the energy level of the exhaust gases is boosted for supplementally driving the turbocharger, and remnants of unburned fuel in the exhaust gases are ignited to reduce system smoke and emissions. However, in the prior art, it has been found that the ignition and sustainment of a flame in the combustor is particularly difficult in the substantially vitiated exhaust gas atmosphere. Accordingly, prior art in-line combustor systems have also utilized atomization techniques in the combustor requiring the atomization of fuel with fresh charge air prior to any mixing with exhaust gases to maintain flame propagation. See, for example, U.S. Pat. Nos. 2,620,621; 2,633,698; 3,736,752; 3,849,988; 3,949,555; 3,988,984; 3,996,748; 4,004,414; 4,009,574; and 4,026,115. However, these systems are undesirable in that they too require an oversized turbocharger for providing fresh charge air to the combustor at all times to maintain the combustor flame. This continuous addition of charge air to the combustor results in fuel-inefficient combustor operation, but has heretofore been necessitated by the inability of prior art systems to operate without fresh air.

The combustor system of this invention overcomes the problems and disadvantages of the prior art by utilizing apparatus and methods for maintaining controlled fuel-efficient combustion in an in-line combustor without requiring the continuous addition of fresh charge air to the combustor.

SUMMARY OF THE INVENTION

In accordance with the invention, a turbocharger combustor system comprises a combustor coupled in-line between the exhaust manifold of a charge air engine and the driving turbine of a turbocharger. Accordingly, the engine exhaust gases pass continually through the combustor prior to communication with the turbocharger. Conveniently, a charge air bypass valve may be included to control bypass of a portion of the charge air flow around the engine to the exhaust system upstream of the combustor whenever bypass air is required for combustor operation. Alternately, the turbocharger may be designed so that excess charge air flow bypassing the engine is available when such bypass flow is needed for combustor operation, and is unavailable due to engine air flow consumption when such bypass flow is not required for combustor operation.

The combustor includes a fuel injection system comprising an axially directed fuel line for supplying a stream of fuel into a cylindrically shaped injector nozzle. The injector nozzle includes a plurality of jet openings which angularly intersect along the fuel stream. A portion of the gases supplied to the combustor is directed through these jet openings for impinging upon and breaking up the fuel stream. A plurality of tangentially oriented swirl openings are disposed downstream of the angular jet openings, and a portion of the gases passing through the combustor is directed through the swirl openings to further atomize and disperse the fuel particles within the nozzle prior to introduction into a combustion chamber.

Fuel is controllably supplied to the combustor by a combustor fuel control system which controls fuel flow generally in inverse proportion to engine speed and/or load. More specifically, in a preferred embodiment, the fuel control system includes means responsive to turbocharger boost pressure to supply relatively large quantities of fuel to the combustor when boost pressure is low. In this manner, the energy level of the gases through the combustor is substantially supplemented which, in turn, increases the boost pressure of the turbocharger to reduce combustor fuel flow. Conveniently, the system also includes purge apparatus for purging fuel from the fuel injection system and the combustor upon combustor shutdown to help prevent undesirable choking and gumming.

BRIEF DESCRIPTION OF THE DRAWINGS

The accompanying drawings illustrate the invention. In such drawings.

DETAILED DESCRIPTION OF THE PREFERRED EMBODIMENT

Figure 1:
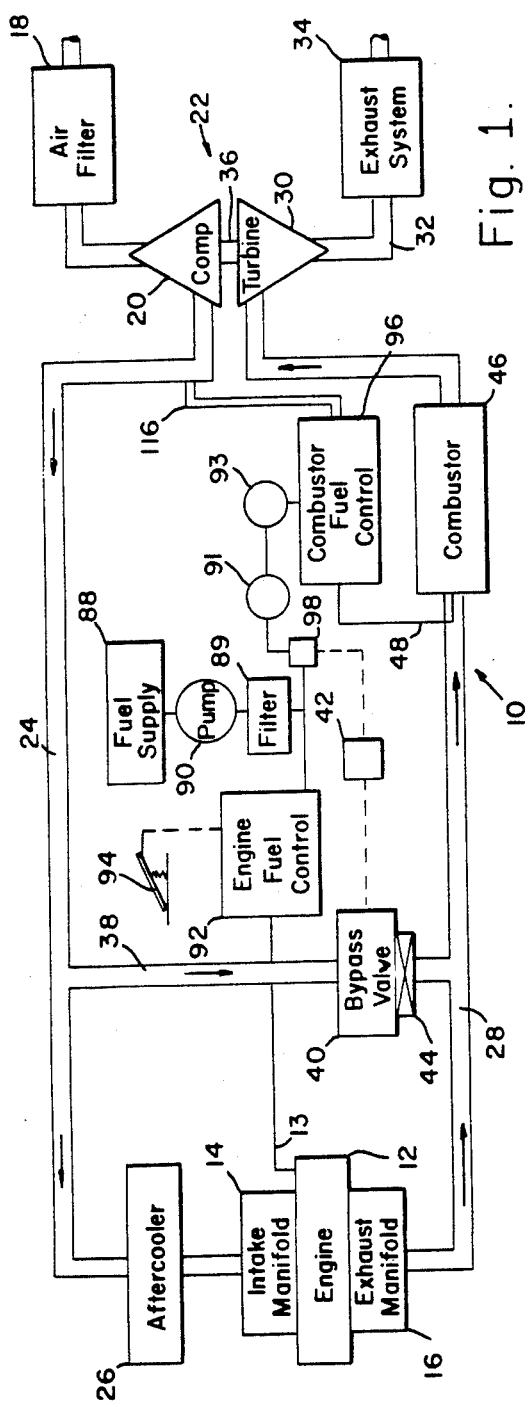
FIG. 1 is a schematic diagram illustrating the turbocharger combustor system of this invention.

The turbocharger combustor system 10 of this invention is shown generally in FIG. 1 in combination with a turbocharged combustion engine 12, such as a turbocharged diesel engine. As shown, the engine 12 includes a fuel intake 13 and a charge air intake manifold 14. Fuel and air supplied through the intake 13 and manifold 14 are suitably mixed to provide the desired air-fuel mixture for combustion within the engine 12. Importantly, the charge air supplied to the intake manifold comprises air drawn through an air filter 18 and compressed to a superatmospheric pressure by a compressor 20 of a turbocharger 22. The compressed charge air is coupled to the intake manifold 14 by a suitable conduit 24 which may conveniently include an aftercooler 26 for reducing the temperature level of the charge air.

Combustion of the air-fuel mixture within the engine 12 results in the generation of relatively high temperature exhaust gases. These gases are collected in an exhaust manifold 16, and ducted through a conduit 28 to a turbine 30 of the turbocharger 22. The exhaust gases rotatably drive the turbine 30 before exhausting to atmosphere through an exhaust conduit 32 which may be interrupted by one or more pollution and/or noise abatement devices 34, all in a well-known manner. Importantly, the rotating turbine 30 is coupled to the turbocharger compressor 20 by a common shaft 36 whereby the turbine 30 drives the compressor 20 to provide compressed charge air for the engine.

The turbocharger 22 is preferably sized generally to match the air flow requirements of the engine at maximum operating conditions without providing substantial excess air flow or boost pressure. That is, when the engine is operated at relatively high speed and high load conditions, the volumetric air flow and boost pressure requirements of the engine to maintain speed and load are at a maximum. In this condition of operation, the energy level of exhaust gases expelled from the engine is sufficient to drive the turbocharger 22 whereby the turbocharger compressor 20 provides the necessary air flow and boost pressure. However, when the engine speed drops off to a relatively low level, the energy level of the engine exhaust gases drops correspondingly. The exhaust gas energy level at such low engine speed is insufficient to drive the turbocharger to provide the necessary compressor boost pressure to maintain engine torque. Accordingly, the combustor system 10 of this invention comprises a gas turbine for substantial supplementation of the energy level of gases supplied for driving the turbocharger 22 at low engine speeds, whereby compressor boost pressure is maintained at a predetermined level at low engine speeds to maintain engine load carrying capacity.

With the combustor system 10 of this invention, the volumetric air flow output of the turbocharger exceeds engine air flow capacity when the engine is operated at relatively low speed and/or load. That is, particularly at high engine speeds, supplementation of exhaust gas energy level is unnecessary because the turbocharger 22 supplies air flow to the engine generally matching engine consumption capacity. However, as speed drops off, the combustor system operates to maintain turbocharger boost whereby charge air is supplied to the engine in excess of engine consumption capacity. As shown in FIG. 1, the combustor system of this invention includes a bypass conduit 38 interconnecting the air supply conduit 24 and the exhaust conduit 28 to controllably bypass the excess portion of charge air around the engine 12 to the exhaust conduit for use in supplementing the exhaust gas energy level, as will be hereafter explained. A bypass valve 40 may interrupt the bypass conduit 38 for controllably opening and closing the bypass conduit to gas flow in accordance with engine operating conditions. In one embodiment, the bypass valve 40 comprises a solenoid-type valve which is opened and closed in response to the position of an operator-controlled switch 42, and includes a check valve 44 which prevents the passage of exhaust gases in the exhaust conduit 28 through the bypass conduit 38 to the charge air supply conduit 24. Alternately, if desired, the valve 40 may be automatically responsive to engine parameters such as, for example, engine speed. Moreover, in another embodiment, the solenoid portion of the bypass valve may be omitted when the system is designed so that excess air for bypassing via the conduit 38 is unavailable at high engine speeds due to engine air flow consumption.

The combustor system 10 of this invention includes an auxiliary or supplemental combustor 46 connected in-line with the exhaust conduit 28 downstream of the bypass conduit 38. The combustor 46 is supplied with a suitable fuel, such as diesel fuel, via a fuel line 48. The fuel is mixed in the combustor 46 with gases flowing therethrough which include the exhaust gases and any available charge air bypassing through the conduit 38. The resulting vaporous mixture includes sufficient quantities of oxygen whereby the mixture is ignitable in the combustor 46 to raise the temperature level of the gases passing therethrough, and thereby increase the energy level of the gases available for driving the turbocharger turbine 30 at low engine speed conditions. In this manner, the turbocharger compressor boost pressure is increased to maintain engine load carrying capacity at a relatively high level.

Figure 2:
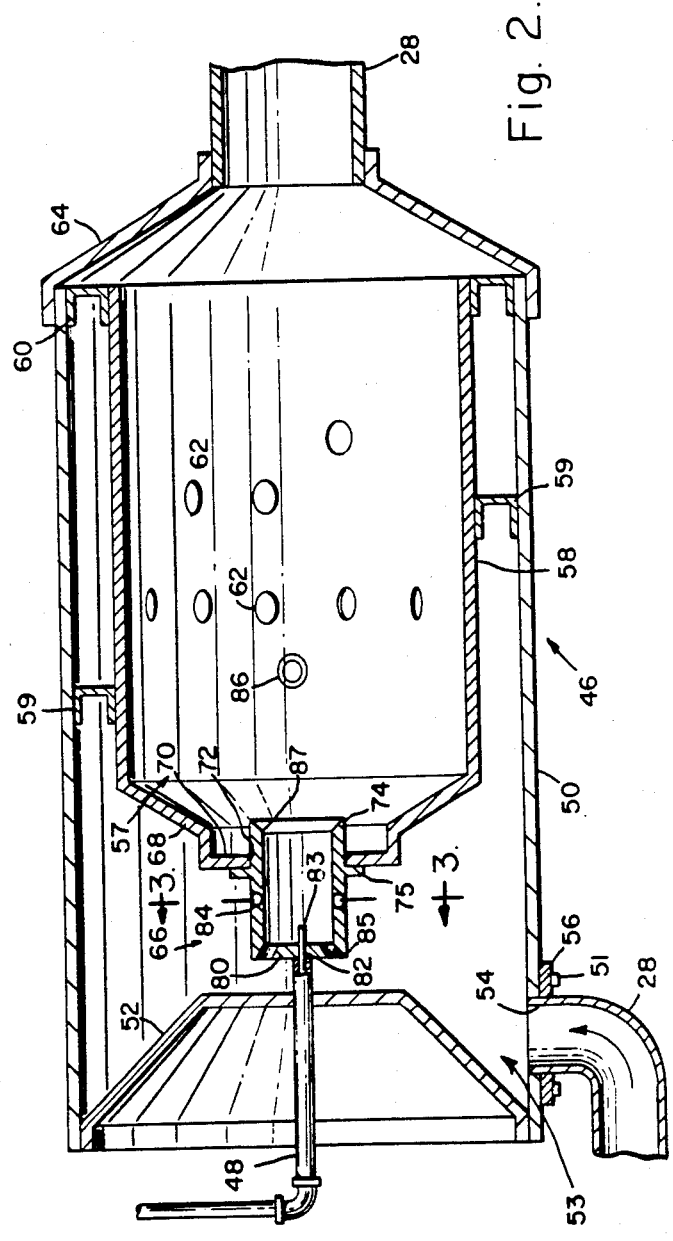
FIG. 2 is an enlarged longitudinal vertical section of the combustor for the system of FIG. 1.

The combustor 46 is shown in detail in FIG. 2. As shown, the combustor 46 comprises a generally cylindrical canister 50 connected in-line with the exhaust conduit 28. The upstream end of the canister 50 is closed by a truncated conical end cap 52 secured with respect to the canister as by welding, and extending inwardly along the longitudinal axis of the canister. The conical end cap 52 is positioned in a gas entrance and mixture portion 53 of the canister to define a gas mixing plenum for exhaust gases and fresh charge air entering the combustor through an opening 54 formed in the wall of the canister generally adjacent the end cap 52. Specifically, the exhaust gas conduit 28 includes a flange 56 for connection as by bolts 51 to the canister 50 in alignment with the opening 54. Engine exhaust gases and any available bypassed charge air together flow through the conduit 28 and enter the combustor 46 via the opening 54. The conical end cap 52 spreads the entering gases to provide a relatively uniform, mixed gas flow across the cross section of the canister.

The major portion of the gas flow in the canister 50 flows axially along the canister and into a generally cylindrical shell 58, defining a combustion chamber 57. As shown, the combustion shell 58 is concentrically supported within the canister 50 by a plurality of support brackets 59 staggered about the shell periphery, and by an annular sealing bracket 60 at the downstream end of the shell. The exhaust gases flow axially along the outer canister 50 between the canister and the shell, and then flow into the shell 58 to the combustion chamber 57 through a series of flow openings 62 formed in the shell periphery along its length. The annular sealing bracket 60 is provided to prevent flow of gases past the combustion shell 58 without passing into the combustion chamber. The downstream end of the shell 58 is open, and communicates with a flared shroud 64 coupled between the exhaust gas conduit 28 and the downstream end of the canister.

Figure 3:
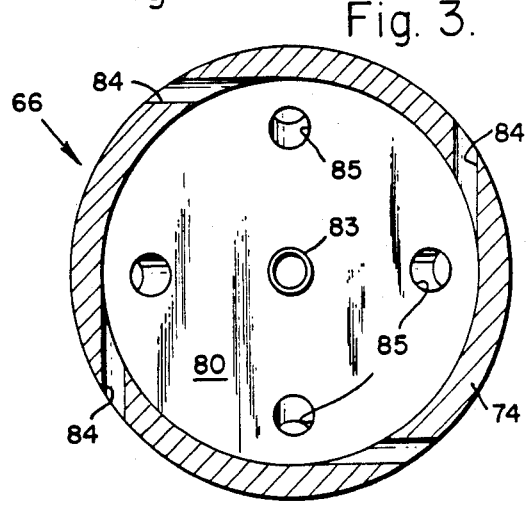
FIG. 3 is an enlarged vertical section taken on the line 3—3 of FIG. 2.

The upstream end of the combustion shell 58 is substantially closed to facilitate the mounting and operation of a fuel injector nozzle 66. Specifically, the upstream end of the shell 58 tapers generally radially inwardly to form a wall 68 having a seat 70 and a central opening 72 for receiving and aligning an injector nozzle 66 generally of the type disclosed in copending application Ser. No. 855,049, now abandoned, by C. J. Clapp. As shown in FIGS. 2 and 3, the nozzle 66 comprises a cylindrical or cup-shaped sleeve 74 having one end received through the central opening 72 and its longitudinal axis aligned with the longitudinal axes of the canister 50 and shell 58. The nozzle sleeve 74 includes a peripheral flange 75 secured with respect to the wall 68 as by suitable welds.

Fuel for the combustor 46 is supplied by the fuel line 48 to the injector nozzle 66. As shown, the upstream end of the nozzle includes a wall 80 having an opening 82 receiving a metering tube 83 carried in the end of the fuel line 48. In the preferred embodiment, the metering tube 83 extends through the opening 82 a short distance into the hollow interior of the nozzle along the axis of the combustion shell 58. The inner diameter of the tube 83 comprises a fuel metering orifice through which a thin fuel stream is projected. In practice of the invention, the orifice diameter is on the order of about 0.030 inch and the propelling fuel pressure drop across the nozzle is relatively low, say on the order of about 30–50 p.s.i.

As shown in FIGS. 2 and 3, the upstream end wall 80 of the injector nozzle 66 includes a plurality of generally axially directed, radially inwardly angled and intersecting gas jet openings 58. These jet openings 85 are equiangularly arranged about the metering tube 83 and provide passages for a portion of the gases flowing through the combustor 46 to direct said portion of the gases into contact with the fuel stream. Desirably, gases flowing through these jet openings 85 intersect at the fuel stream; preferably generally slightly beyond the termination of the fuel metering tube 83. In this manner, the gases flowing through the jet openings 85 shear the fuel stream immediately upon exiting the metering tube to break up the fuel into small droplets within the nozzle interior to provide a substantially atomized fog of fuel and gases. The gases flowing through the nozzle impart an axial component of velocity to the fuel fog which helps to propel the air-fuel mixture toward the combustion chamber 57 largely independent of the low fuel line pressure.

A series of tangential swirl openings 84 are formed in the injector nozzle 66 immediately downstream of the jet openings 85. These swirl openings 84 are also equiangularly arranged about the nozzle, and provide passages for another portion of the gases flowing through the combustor into the nozzle. Each swirl opening 84 is configured whereby gases flowing through the openings 84 enter the nozzle generally normal to the dominant axial direction of flow and tangentially with respect to the nozzle cross section. Accordingly, the swirl openings 84 admit gases to the nozzle interior in a manner to increase the turbulence of gas and liquid fuel intermixture, and to prevent adherence of liquid fuel to the nozzle wall surfaces. The combined effects of the jet openings 85 and the swirl openings 84 thereby creates a swirling, highly atomized air-fuel mixture which exits the injector nozzle 66 as a spreading, cone-shaped cloud. The conical shape is enhanced by a radially outward taper 87 formed at the exit end of the nozzle.

The air-fuel mixture within the combustion shell 58 is ignited by a suitably operated igniter 86 to provide a sustainable combustor flame. The presence of combustion within the combustor 46 increases the temperature of the gases to correspondingly increase the energy level of the gases passing through the combustor to increase the energy level of gases available for driving the turbocharger 22.

Fuel for the engine 12 and the combustor 46 is provided from a fuel supply 88 by a fuel pump 90, as illustrated in FIG. 1. The pump 90 supplies fuel through a filter 89 to the engine as determined by an engine fuel control 92, such as, for example, a fuel injection system and an operator controlled throttle 94. The pump 90 also supplies fuel through the filter 89 to the combustor 46 as determined by a combustor fuel control 96 with an upstream auxiliary pump 91, flow regulator 93, and a shut-off valve 98. In the preferred embodiment, the combustor fuel control 96 is responsive to engine operation-indicating parameters such as turbocharger boost pressure to increase the fuel supply to the combustor whenever the boost pressure begins to drop off. Thus, the combustor provides substantial supplementation of the engine exhaust gas energy level for maintaining turbocharger operation at a relatively high speed, and thereby prevents undesirable dropping off of engine torque capacity.

Figure 4:
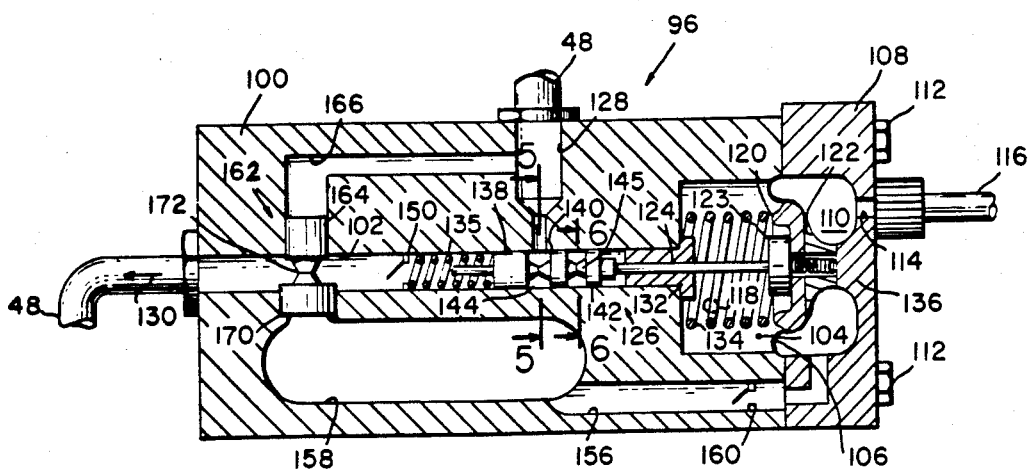
FIG. 4 is an enlarged longitudinal vertical section of the combustor fuel control.
Figure 5:
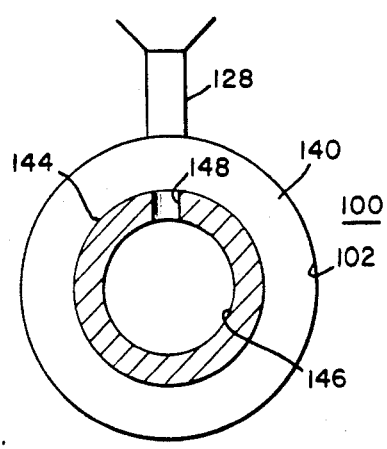
FIG. 5 is an enlarged vertical section taken on the line 5—5 of FIG. 4.
Figure 6:
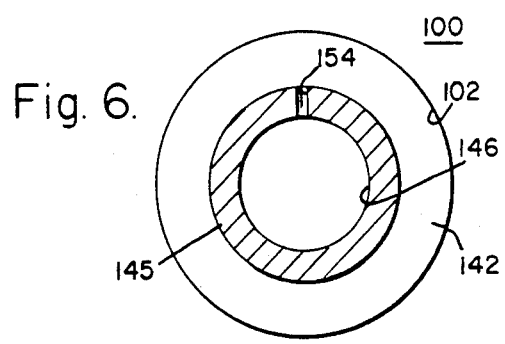
FIG. 6 is an enlarged section taken on the line 6—6 of FIG. 4.

The combustor fuel control 96 is shown in more detail in FIGS. 4–6, and comprises a main valve body 100 connected along the fuel line 48 upstream of the combustor 46. The main valve body 100 includes a longitudinally extending central bore 102 communicating at one end with a recessed chamber 104. The chamber 104 is closed by a flexible diaphragm 106 trapped between the one end of the valve body 100 and a cap 108 which also includes a recessed chamber 110. More specifically, the cap 108 is secured onto the valve body 100 as by screws 112 whereby the chambers 104 and 110 are disposed on opposite sides of the diaphragm 106. In operation, the chamber 110 is exposed to discharge boost pressure of the turbocharger compressor 20 via a port 114 and a line 116 tapped into the discharge side of the compressor, and the chamber 104 is exposed to ambient pressure by a port 118. Accordingly, the diaphragm 106 is exposed to and movably responds to the difference between compressor discharge pressure and ambient pressure.

The diaphragm 106 is centrally reinforced by a pair of opposed retainer plates 120 and 122 connected to a valve stop 123. The valve stop 123 bears against a longitudinally extending valve stem 124 which projects through the chamber 104 and into the central bore 102 for abutting engagement with a spool valve 126. The spool valve 126 is carried along the central bore 102 to control fuel flow between a fuel inlet passage 128 tapped into the bore 102, and the fuel line 48 downstream of the valve body 100 as indicated by the arrow 130. Importantly, passage of fuel into the chamber 104 is prevented by a plug 132 carried about the valve stem 124. Moreover, a spring 134 is interposed between the valve body 100 and the retainer plate 120 to provide the desired bias to the valve stem 124, and a stop 136 is formed within the chamber 110 to provide the desired threshold point for valve stem movement.

The spool valve 126 is shaped to provide substantially different fuel flows in response to different operating conditions of the engine 12. The spool valve 126 comprises a generally cylindrical shaft having three piston-like spools 138, 140 and 142, slidably received in the valve body central bore 102 and separated by recessed portions 144 and 145 of reduced diameter. As shown in FIGS. 5 and 6, the spool valve 126 has an axially extending valve passage 146, and the first spool 138 provides a seal between the valve body 100 and the spool valve. The recess 144 between the spools 138 and 140 includes a relatively large radially extending port 148 for alignment with the fuel inlet passage 128 as shown in FIG. 5. This port 148 is biased toward alignment with the fuel inlet passage 128, during relatively low speed and/or load engine operation, as indicated by the compressor boost pressure, by the diaphragm spring 134 and a secondary spring 135 interposed between the spool valve 126 and a check valve 150 in the central bore 102. That is, during these operating conditions, the turbocharger 22 normally provides a relatively low compressor discharge boost pressure. This discharge pressure in chamber 110 does not overcome the spring bias on the diaphragm 106 whereby the valve stem 124 is positioned by the secondary spring 135 to dispose the relatively large fuel port 148 in alignment with the fuel inlet passage 128. When this occurs, a relatively high fuel flow passes through the inlet passage 128, the port 148, and the spool valve passage 146. The fuel passes further through the central bore 102 past the one-way check valve 150 to the downstream fuel line 48 for passage to the combustor 46. The large quantity of fuel supplied to the combustor 46 results in a substantial combustion flame to provide significant supplementation of the energy level of the gases in the combustor. In this manner, the energy level of gases available for driving the turbocharger 22 is sufficiently increased to increase compressor discharge boost pressure and engine load capacity. Importantly, during such engine operating conditions, the boost level is sufficiently maintained whereby sufficient excess bypass charge air is available for mixture with exhaust gases upstream of the combustion in chamber 57 to assure adequate supplies of oxygen in the combustor.

At relatively high speed and/or load engine operation, the turbocharger compressor discharge pressure is relatively high. In this condition, the pressure in chamber 110 causes the diaphragm 106 and valve stem 124 to movably respond to position the recess 145 between the spools 140 and 142 in alignment with the fuel inlet passage 128. This recess 145 includes a relatively small radially extending fuel port 154 for communication between the inlet passage 128 and the spool valve passage 146. This relatively small port 154 thus reduces the fuel flow to the combustor 46 to reduce the combustor temperature to a desired low level. In this manner, supplementation of the energy level of the gases in the combustor is substantially curtailed during periods of relatively high speed and/or load engine operation. During such periods, the level of the oxygen in the engine exhaust gases is sufficient to maintain propagation of the combustor flame without the addition of fresh bypass charge air, whereby all of the charge air may be supplied directly to the engine 12. In the embodiment including the bypass valve 40, said valve may be closed during such conditions of the engine operation to assure fuel-efficient combustor operation. In any event, the check valve 44 prevents reverse flow through the bypass conduit 38.

Figure 7:
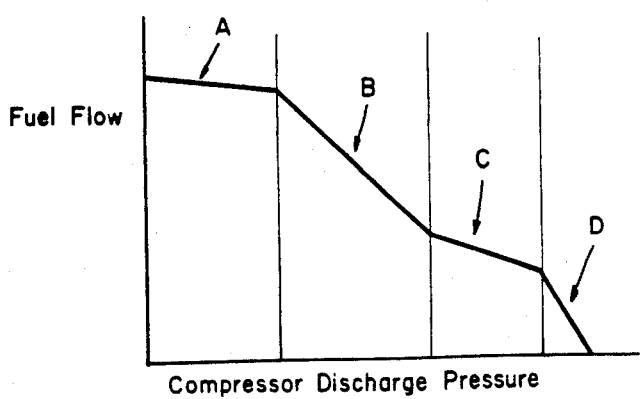
FIG. 7 is a graphical representation of fuel flow through the combustor fuel control of FIGS. 4–6.

The overall fuel flow characteristics of the combustor fuel control 96 are illustrated graphically in FIG. 7 wherein fuel flow is plotted in relation to compressor discharge pressure. As illustrated, when compressor discharge boost pressure is relatively low, the fuel control 96 positions the larger fuel port 148 in alignment with the fuel inlet passage 128 to result in a relatively high fuel flow to the combustor 46 as indicated at "A." In this position, the relatively large fuel flow results in a relatively high combustor temperature to substantially supplement the energy level of the gases passing therethrough. Importantly, when the boost pressure is relatively low, the oxygen level of the exhaust gases is relative low. However, at this condition of operation, the turbocharger compressor 20 is driven to provide excess volumetric air flow through the bypass conduit 38 to the combustor 46 to assure sustainment of a combustor flame.

As boost pressure increases, the central spool 140 of the spool valve 126 begins to close communication between the larger fuel port 148 and the fuel inlet 128, and to open communication between the small fuel port 154 and the fuel inlet 128. This results in a decreasing range of fuel flow indicated by the region "B" of FIG. 7. This decreasing fuel flow causes a corresponding decrease in the combustor temperature. However, this decrease is desirable since less energy level supplementation is required at higher boost pressures. Moreover, as boost pressure increases, the air flow capacity of the engine increases whereby available bypass air to the combustor decreases.

As compressor boost pressure further increases to a relatively high level, the smaller fuel port 154 fully communicates with the fuel inlet passage 128. This results in a still smaller fuel flow to the combustor indicated by the region "C" of FIG. 7. This fuel flow may be programmed to reduce the combustor temperature to any desired level, such as, for example, a pilot flame, providing a temperature difference across the combustor of as low as about 100° F. and using on the order of about five pounds per hour of fuel. Of course, as mentioned above, the turbocharger may be designed so that such further increases in boost pressure are related to increases in engine speed, and ultimately reduce the availability of bypass air to zero. Alternately, the switch 42 (FIG. 1) may be programmed for automatically or manually closing the bypass valve 40 throughout this region of fuel flow to prevent bypass air from reaching the combustor 46, and thereby assure optimum fuel efficiency of combustor operation. Importantly, at these high boost pressures, the exhaust gas oxygen content together with the high quality atomization of fuel by the injector nozzle 66 allows continued propagation of a combustor flame without the presence of bypass air.

In some embodiments of the invention, it may be desirable to turn off the combustor flame when the engine is operated at or near top speed. In this manner, no fuel is wasted in the combustor, even for sustainment of a pilot flame. This mode of operation is achieved by configuring the combustor fuel control 96 (FIG. 4) so that the third spool 142 of the spool valve 126 closes off fuel flow through the fuel inlet passage 128 when maximum compressor discharge pressure is reached. As the spool 142 closes off the fuel flow, the fuel flow to the combustor 46 drops off rapidly to zero as illustrated by the region "D" in FIG. 7. In this mode of operation, the engine 12 operates as a normal turbocharged combustion engine without supplementation of the exhaust gas energy level. Of course, when compressor discharge pressure decreases to indicate a decrease in engine speed, the smaller fuel port 154 may be returned to communication with the fuel inlet passage 128 to re-establish fuel flow to the combustor. When this occurs, the igniter 86 is used to re-establish a combustor flame.

The combustor fuel control 96 includes an automatic or self-actuating fuel line purge system for controllably expelling fuel from the fuel line 48 and the injector nozzle 66. In this manner, high temperatures present in the vicinity of the combustor 46 do not cause coking or gumming of the fuel line or the injector nozzle whereby fuel flow to the combustor is assured when desired. Specifically, the purge system comprises a passage 156 formed in the valve body 100 and cap 108, and extending between the chamber 110 and a relatively large plenum chamber 158 formed in the main valve body 100. Fresh charge air bled into the chamber 110 for controlling the spool valve 126 is used to pressurize the plenum chamber 158. A portion of this fresh charge air passes through the passage 156 into the chamber 158 to pressurize said chamber. A check valve 160 in the passage 156 allows this gas passage until pressure on both sides of the check valve equalizes. Of course, when compressor discharge pressure drops, the plenum chamber 158 remains pressurized.

The plenum chamber 158 communicates with the valve body central bore 102 downstream of the check valve 150 by means of a poppet valve 162. The poppet valve 162 comprises a stem 164 slidably received in a passage 166 communicating between the central bore 102 and the fuel inlet passage 128. The valve 162 also comprises a valve head 170 for closing the plenum chamber 158, and a reduced cross section portion 172 between the head 170 and the stem 164 allows free fuel passage through the central bore 102 when the plenum chamber 158 is closed. However, when fuel pressure in the inlet passage 128 drops, such as when the combustor is shut down, the fuel pressure acting upon the poppet valve 162 through the passage 166 drops whereby the poppet valve 162 is opened by the pressure within the plenum chamber. More specifically, when fuel flow to the combustor 46 is interrupted as by operating the switch 42 to close the shut-off valve 98 (FIG. 1), the poppet valve 162 is opened. This allows the fresh charge air in the plenum chamber 158 to escape through the central bore 102 and the fuel line 48 to purge fuel from the fuel line and the injector nozzle 66. This is particularly important in that gumming and coking of the fuel line and injector nozzle is prevented in spite of the relatively high temperature in the vicinity of the combustor.

The engine 12 including the turbocharger combustor system 10 shown in FIG. 1 is operated as follows. The engine 12 is started in a usual manner, and may be operated as a conventional turbocharged engine without igniting the combustor 46. When it is desired to maintain the compressor boost pressure at a predetermined threshold level to maintain engine torque capacity at low engine speeds, the engine is accelerated at low load to provide substantial boost pressure at or above the threshold and to provide substantial engine air flow. Then, the combustor fuel control 96 is activated to supply fuel to the combustor 46 in relation to the existing boost pressure, and the igniter 86 is used to initiate a combustor flame. At this point, combustor operation continues automatically in response to compressor boost pressure to provide the desired supplemental driving of the turbocharger. Or, if desired, the combustor 46 may be turned off at high boost pressures as described above.

A wide variety of modifications of the combustor system of this invention are believed to be within the skill of the art. For example, the biasing and sizing of the combustor fuel control may be altered nd to stantially any desired pressure response, or to respoother engine operation-indicating parameters. These and other modifications are believed to be encompassed by the foregoing specification and the appended claims.

What is claimed is:

1. In an internal combustion reciprocating engine having a turbocharger driven by exhaust gases to provide compressed charge air to the engine, a method of supplementing the energy level of the exhaust gases at selected engine operating conditions comprising the steps of mounting a combustor in an exhaust conduit between the engine and the turbocharger for in-line passage of the exhaust gases; controllably supplying fuel to the combustor in response to engine operating conditions; injecting and atomizing with fuel injector means the fuel supplied to the combustor using a portion of the gases flowing through the combustor to permit combustor operation with sustained combustion of the fuel and the gases flowing through the combustor, said injecting and atomizing step including forming a cup-shaped fuel nozzle having a base at a fuel entrance end and a relatively open exit end opening into the combustor, directing a stream of fuel supplied in said fuel supplying step along the longitudinal axis of the nozzle via a fuel metering tube received through the base and extending a short distance into the nozzle interior, directing a plurality of axially and angularly inwardly directed gas jets through jet openings formed in said nozzle for intersection at the fuel stream slightly beyond the termination of the metering tube to turbulently break up and substantially immediately pick up and atomize the fuel stream, and directing a plurality of tangential swirl gas streams through swirl openings formed radially with respect to the point of intersection of the gas jets the combined effect of the gas jets and swirl streams creating a substantially atomized gas-fuel cloud for combustion within the combustor; controllably bypassing a surplus portion of the turbocharger charge air flow around the engine to the combustor during relatively low speed engine operating conditions; and preventing bypass air flow around the engine at relatively high speed engine operating conditions, said bypassing step including mixing of the surplus portion of bypass air flow with exhaust gases upstream of the combustor.

2. The method of claim 1 including the step of forming an exit portion on said nozzle of increasing inner diameter whereby the gas-fuel cloud exits the nozzle in a spreading generally conical configuration.

3. The method of claim 1 wherein said fuel supply step includes supplying fuel to the combustor generally in inverse proportion to the pressure of charge air supplied to the engine.

4. The method of claim 3 wherein said fuel supply step includes varying the position of a fuel flow control valve between a maximum flow condition at low charge air pressure to a no flow condition at relatively high charge air pressure whereby combustor operation ceases at the no flow condition.

5. The method of claim 1 wherein said fuel supply step includes selectively closing off the fuel supply to the combustor, and including the step of purging fuel from the fuel injector means and the combustor when fuel flow to the combustor is closed off.

6. The method of claim 1 wherein said bypassing step comprises controlling bypass air flow with a bypass valve and closing said bypass valve to prevent bypass air flow at predetermined engine operating conditions.

7. In an internal combustion reciprocating engine having a turbocharger driven by exhaust gases to provide compressed charge air flow to the engine; a method of supplementing the energy level of the exhaust gases when the charge air pressure is relatively low comprising the steps of mounting a combustor in an exhaust conduit between the engine and the turbocharger for in-line passage of the exhaust gases; controllably supplying fuel to the combustor in inverse proportion to charge air pressure; injecting and atomizing with fuel injector means the fuel supplied to the combustor using a portion of the gases flowing through the combustor to permit combustor operation with sustained combustion of the fuel and the gases flowing therethrough, said injecting and atomizing step including forming a cup-shaped fuel nozzle having a base at a fuel entrance end and a relatively open exit end opening into the combustor, directing a stream of fuel supplied in said fuel supplying step along the longitudinal axis of the nozzle via a fuel metering tube received through the base and extending a short distance into the nozzle interior, directing a plurality of axially and angularly inwardly directed gas jets through jet openings formed in said nozzle for intersecting at the fuel stream slightly beyond the termination of the metering tube to turbulently break up and substantially immediately pick up and atomize the fuel stream, and directing a plurality of tangential swirl gas streams through swirl openings formed radially with respect to the point of intersection of the gas jets, the combined effect of the gas jets and swirl streams creating a substantially atomized gas-fuel cloud for combustion within the combustor; and controllably bypassing a surplus portion of the turbocharger charge air flow around the engine to the combustor during relatively low speed engine operation and mixing the surplus portion of bypass air flow with exhaust gases upstream of the combustor when charge air pressure is relatively low, said surplus portion of charge air flow being generally unavailable when engine speed is relatively high.

8. In an internal combustion engine having a turbocharger driven by exhaust gases to provide compressed charge air to the engine, a method of supplementing the energy level of the exhaust gases when charge air pressure is relatively low comprising the steps of mounting a combustor in an exhaust conduit between the engine and the turbocharger for passage of the exhaust gases; controllably supplying a stream of fuel to the combustor in inverse proportion to charge air pressure; injecting and atomizing with fuel injector means the fuel supplied to the combustor using the flow of gases through the combustor to permit combustor operation with sustained combustion, said injecting and atomizing step including the steps of forming a cup-shaped fuel nozzle having a base at a fuel entrance end and a relatively open exit end opening into the combustor, directing the fuel stream axially into the nozzle via a fuel metering tube received through the base and extending a short distance into the nozzle interior, directing a plurality of axially and angularly inwardly directed gas jets through jet openings formed in said nozzle for intersection at the fuel stream slightly beyond the termination of the metering tube to turbulently break up and substantially immediately pick up and atomize the fuel stream, and directing a plurality of tangential swirl gas streams through swirl openings formed radially with respect to the point of intersection of the gas jets, the combined effect of the gas jets and swirl streams creating a substantially atomized gas-fuel cloud for combustion within the combustor; controllably bypassing a portion of the turbocharger charge air flow around the engine to the combustor when charge air pressure is relatively low; preventing the bypass of charge air when charge air pressure is relatively high; and purging the fuel supplied to the fuel injector means and combustor with purge means responsive to fuel pressure when the fuel supply to the combustor is closed off.

9. The method of claim 8 including the step of forming an exit portion on said nozzle of increasing inner diameter whereby the gas-fuel cloud exits the nozzle in a spreading generally conical configuration.

10. The method of claim 8 wherein said bypassing step comprises controlling bypass air flow with a bypass valve and closing said bypass valve to prevent bypass air flow at predetermined engine operating conditions.

11. The method of claim 8 wherein the turbocharger charge air flow matches engine air flow requirements at relatively high operating speed and load whereby bypass air is available when charge air pressure is relatively low and unavailable when charge air pressure is relatively high.

12. In an internal combustion engine having a turbocharger driven by exhaust gases to provide compressed charge air to the engine, a method of supplementing the energy level of the exhaust gases at selected engine operating conditions comprising the steps of mounting a combustor in an exhaust conduit between the engine and the turbocharger for inline passage of the exhaust gases; controllably supplying fuel to the combustor in response to engine operating conditions; injecting and atomizing with fuel injector means the fuel supplied to the combustor using a portion of the gases flowing through the combustor to permit combustor operation with sustained combustion of the fuel and the gases flowing through the combustor, said injecting and atomizing step including forming a cup-shaped fuel nozzle having a base at a fuel entrance end and a relatively open exit end opening into the combustor, directing a stream of fuel supplied in said fuel supplying step along the longitudinal axis of the nozzle via a fuel metering tube received through the base and extending a short distance into the nozzle interior, directing a plurality of axially and angularly inwardly directed gas jets through jet openings formed in said nozzle for intersection at the fuel stream slightly beyond the termination of the metering tube to turbulently break up and substantially immediately pick up and atomize the fuel stream, and directing a plurality of tangential swirl gas streams through swirl openings formed radially with respect to the point of intersection of the gas jets, the combined effect of the gas jets and swirl streams creating a substantially atomized gas-fuel cloud for combustion within the combustor; and controllably bypassing a surplus portion of the turbocharger charge air flow around the engine to the combustor during selected engine operating conditions and preventing bypass air flow around the engine for at least some engine operating conditions, said bypassing step including mixing of the surplus portion of bypass air flow with exhaust gases upstream of the combustor.

13. In an internal combustion engine having a turbocharger driven by exhaust gases to provide compressed charge air to the engine, a method of supplementing the energy level of the exhaust gases when the charge air pressure is relatively low comprising the steps of mounting a combustor in an exhaust conduit between the engine and the turbocharger for in-line passage of the exhaust gases; controllably supplying fuel to the combustor in inverse proportion to charge air pressure; injecting and atomizing with fuel injector means the fuel supplied to the combustor using a portion of the gases flowing through the combustor to permit combustor operation with sustained combustion of the fuel and the gases flowing therethrough, said injecting and atomizing step including forming a cup-shaped fuel nozzle having a base at a fuel entrance end and a relatively open exit end opening into the combustor, directing a stream of fuel supplied in said fuel supplying step along the longitudinal axis of the nozzle via a fuel metering tube received through the base and extending a short distance into the nozzle interior, directing a plurality of axially and angularly inwardly directed gas jets through jet openings formed in said nozzle for intersection at the fuel stream slightly beyond the termination of the metering tube to turbulently break up and substantially immediately pick up and atomize the fuel stream, and directing a plurality of tangential swirl gas streams through swirl openings formed radially with respect to the point of intersection of the gas jets, the combined affect of the gas jets and swirl streams creating a substantially atomized gas-fuel cloud for combustion within the combustor; controllably bypassing a surplus portion of the turbocharger charge air flow around the engine to the combustor and mixing the surplus portion of bypass air flow with exhaust gases upstream of the combustor when charge air pressure is relatively low and preventing the bypass charge air when charge air pressure is relatively high; and purging the fuel supplied to the fuel injector means and combustor with purge means responsive to fuel pressure when the fuel supply to the combustor is closed off.

14. In an internal combustion reciprocating engine having a turbocharger driven by exhaust gases to provide compressed charge air to the engine, a method of supplementing the energy level of the exhaust gases when the charge air pressure is relatively low comprising the steps of:
continuously passing all of the engine exhaust gases through a combustor disposed in an exhaust conduit between the engine and the turbocharger;
controllably supplying fuel to the combustor in inverse proportion to charge air pressure;
mixing a portion of the exhaust gases passing through the combustor with the fuel supplied to the combustor to create a substantially atomized gas-fuel cloud for combustion within the combustor;
bypassing a surplus portion of the turbocharger charge air flow around the engine to the combustor during relatively low speed engine operation and mixing this surplus portion with the exhaust gases upstream of the combustor; and
supplying fuel to the combustor without bypassed charge air flow during relatively high speed engine operation to sustain combustion in the combustor.

15. In an internal combustion reciprocating engine having a turbocharger driven by exhaust gases to provide compressed charge air to the engine, a method of supplementing the energy level of the exhaust gases when the charge air pressure is relatively low comprising the steps of:
continuously passing all of the engine exhaust gases through a combustor disposed in an exhaust conduit between the engine and the turbocharger;
controllably supplying fuel to the combustor in response to engine operating conditions;
mixing a portion of the exhaust gases passing through the combustor with the fuel supplied to the combustor to create a substantially atomized gas-fuel cloud for combustion within the combustor;
bypassing a surplus portion of the turbocharger charge air flow around the engine to the combustor during relatively low speed engine operation and mixing this surplus portion with the exhaust gases upstream of the combustor; and
supplying fuel to the combustor without bypassed charge air flow during relatively high speed engine operation to sustain combustion in the combustor.

* * * * *